(12) United States Patent
Bhardwaj et al.

(10) Patent No.: US 11,544,015 B2
(45) Date of Patent: Jan. 3, 2023

(54) PRINT JOB TIME AND LOCATION RESTRICTIONS

(71) Applicant: Hewlett-Packard Development Company, L.P., Spring, TX (US)

(72) Inventors: Gopesh Bhardwaj, Bangalore (IN); Mahendra Sannagonappla Pampanna, Bangalore (IN); Rajakishore Sahu, Bangalore (IN); Puranjaya Pradhan, Bangalore (IN); Md Asghar, Bangalore (IN)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 17/298,566

(22) PCT Filed: Jan. 15, 2020

(86) PCT No.: PCT/US2020/013604
§ 371 (c)(1),
(2) Date: May 29, 2021

(87) PCT Pub. No.: WO2020/190357
PCT Pub. Date: Sep. 24, 2020

(65) Prior Publication Data
US 2022/0019390 A1 Jan. 20, 2022

(51) Int. Cl.
*G06F 3/12* (2006.01)
(52) U.S. Cl.
CPC .......... *G06F 3/1222* (2013.01); *G06F 3/1238* (2013.01); *G06F 3/1267* (2013.01)

(58) Field of Classification Search
None
See application file for complete search history.

(56) References Cited

U.S. PATENT DOCUMENTS

| 9,110,608 B2 | 8/2015 | Schultz et al. |
| 2002/0059318 A1* | 5/2002 | Nomura ............... H04N 1/0005 |
| 2003/0002073 A1 | 1/2003 | Berkema et al. |
| 2011/0157626 A1 | 6/2011 | Park |
| 2013/0163027 A1 | 6/2013 | Shustef |
| 2014/0055809 A1* | 2/2014 | Nishida .................. G06F 3/1238 358/1.14 |
| 2016/0162225 A1 | 6/2016 | Ding et al. |
| 2016/0323478 A1* | 11/2016 | Tsutsumi ........... H04N 1/00307 |
| 2017/0242638 A1 | 8/2017 | Seigel et al. |
| 2017/0262739 A1 | 9/2017 | Lehotsky et al. |
| 2017/0280004 A1 | 9/2017 | Inoue et al. |
| 2017/0344325 A1 | 11/2017 | Osadchyy et al. |

FOREIGN PATENT DOCUMENTS

| JP | 2010092133 A | 4/2010 |
| WO | WO-2010/034653 A1 | 4/2010 |

* cited by examiner

*Primary Examiner* — Thomas D Lee
(74) *Attorney, Agent, or Firm* — Brooks, Cameron & Huebsch, PLLC

(57) ABSTRACT

Examples disclosed herein relate to storing a print job comprising a time restriction and a location restriction, receiving a request to retrieve the print job for printing, determining whether the time restriction and the location restriction are satisfied by the request, and in response to determining that the time restriction and the location restriction are satisfied by the request, providing the print job for printing.

19 Claims, 3 Drawing Sheets

PRINT JOB TIME AND LOCATION RESTRICTIONS

BACKGROUND

Multi-function devices often combine different components such as a printer, scanner, and copier into a single device. Such devices frequently receive refills of consumables, such as print substances (e.g., ink, toner, and/or additive materials) and/or media (e.g., paper, vinyl, and/or other print substrates).

Figure 1:
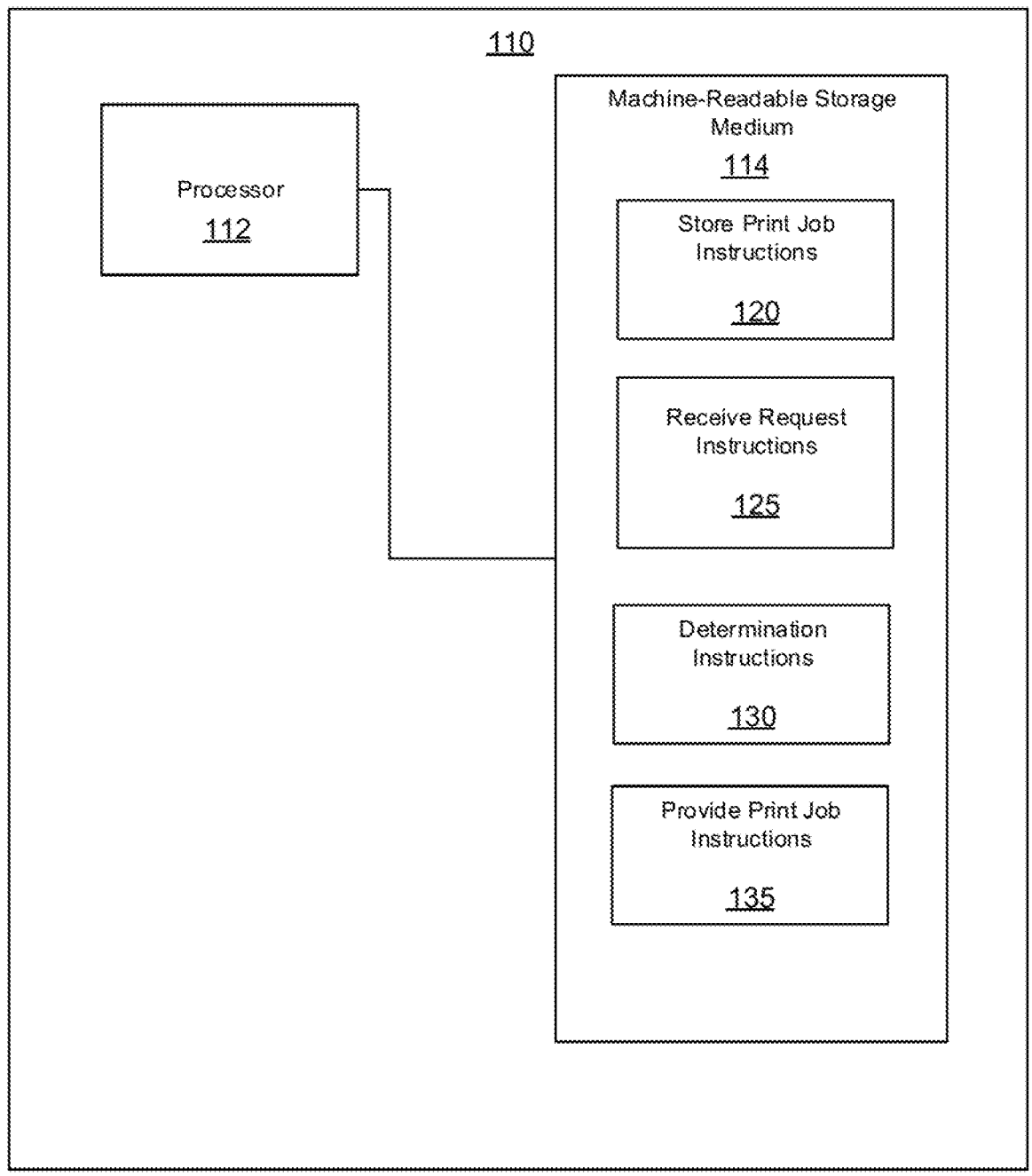
FIG. 1 is a block diagram of an example computing device for providing print job time and location restrictions.

Throughout the drawings, identical reference numbers designate similar, but not necessarily identical, elements. The figures are not necessarily to scale, and the size of some parts may be exaggerated to more clearly illustrate the example shown. Moreover the drawings provide examples and/or implementations consistent with the description; however, the description is not limited to the examples and/or implementations provided in the drawings.

DETAILED DESCRIPTION

Most multi-function-print devices (MFPs) provide several features, such as an option to print, copy, and/or scan a physical document, which may be controlled via an on-device control panel, a connected application, and/or a remote service. Other options may include faxing, finishing, processing, document assembly, etc. The scanning portion of an MFP may comprise an optical assembly located within a sealed enclosure. The sealed enclosure may have a scan window through which the optical assembly can scan a document, which may be placed on a flatbed and/or delivered by a sheet feeder mechanism.

Modern printing devices often implement controls to enable document security. For example, the printing device may require a user to authenticate, such as by entering a username/password login, a personal identification number (PIN), and/or other credentials. In some implementations discussed herein, a document to be printer may require additional restrictions to be met. For example, the document may be restricted to printing devices located within a limited area (e.g., a specific office or geographic boundary). For another example, the document may be restricted to printing during certain times (e.g., only after a specific time and date and/or within a time/date window).

As an example, a teacher may prepare a test document for students that they may print themselves. To preserve a time limit on the test, the teacher may set a restriction on the document, which may be embedded in metadata in the document itself and/or configured as part of a document storage service (e.g., cloud storage solution such as Dropbox). The time restriction may allow the document to be printed only after a certain time (e.g., after 9:00 on the day the test is to be administered). For additional security, the teacher may restrict the document to being printed only on printing devices located in a specific location, such as within the school grounds and/or within a certain distance of the school.

In some implementations, when a pull print job (i.e., a document stored remotely from the printing device that can be accessed and released by a user at the printing device) is created by a printer driver or other application, new options may be provided to the user. For example, the user may be given an option to define the time(s) when the job will be available for printing and any geolocation restrictions on the printers from where the job can be pulled. For example, GPS-enabled printers may provide the geolocation coordinates in printer configuration details. For another example, print device locations may be defined by an administrator of the printer (e.g., define a print device as associated with Company X in Office Y.) In some implementations, the geographic restriction may further limit the document to being printed on specific devices and/or types of devices (e.g., only printers with stapler and/or duplex capability) within the defined location.

FIG. 1 is a block diagram of an example computing device 110 for providing print job time and location restrictions. Computing device 110 may comprise a processor 112 and a non-transitory, machine-readable storage medium 114. Storage medium 114 may comprise a plurality of processor-executable instructions, such as store print job instructions 120, receive request instructions 125, determination instructions 130, and provide print job instructions 135. In some implementations, instructions 120, 125, 130, 135 may be associated with a single computing device 110 and/or may be communicatively coupled among different computing devices such as via a direct connection, bus, or network.

Processor 112 may comprise a central processing unit (CPU), a semiconductor-based microprocessor, a programmable component such as a complex programmable logic device (CPLD) and/or field-programmable gate array (FPGA), or any other hardware device suitable for retrieval and execution of instructions stored in machine-readable storage medium 114. In particular, processor 112 may fetch, decode, and execute instructions 120, 125, 130, 135.

Executable instructions 120, 125, 130, 135 may comprise logic stored in any portion and/or component of machine-readable storage medium 114 and executable by processor 112. The machine-readable storage medium 114 may comprise both volatile and/or nonvolatile memory and data storage components. Volatile components are those that do not retain data values upon loss of power. Nonvolatile components are those that retain data upon a loss of power.

The machine-readable storage medium 114 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, and/or a combination of any two and/or more of these memory components. In addition, the RAM may comprise, for example, static random access memory (SRAM), dynamic random access memory (DRAM), and/or magnetic random access memory (MRAM) and other such devices. The ROM may comprise, for example, a programmable read-only memory (PROM), an erasable programmable read-only memory (EPROM), an electrically erasable programmable read-only memory (EEPROM), and/or other like memory device.

Store print job instructions 120 may store a print job comprising a time restriction and a location restriction. The location restriction may comprise, for example, a geographic area in which a printing device must be located such as a defined radius from a central point, a building and/or buildings, and/or a map-based boundary (e.g., within city limits). The time restriction may comprise, for example, a window of time the print job is permitted to be printed, a time before which the print job is not permitted to be printed, and/or a time after which the print job is not permitted to be printed. In some implementations, the time restriction and the location restriction are set by a second user associated with storing the print job. For example, the document to be printed may be stored by a different user than the one requesting to print it. The storage of the print job may occur, for example, by encoding and/or encrypting the document and transmitting it to a network storage location accessible by various print devices. For example, the print job may be encrypted and stored on a cloud storage service and/or shared network drive.

The location restriction may comprise, for example, a geographic area in which a printing device must be located such as a defined radius from a central point, a building and/or buildings, and/or a map-based boundary (e.g., within city limits). The time restriction may comprise, for example, a window of time the print job is permitted to be printed, a time before which the print job is not permitted to be printed, and/or a time after which the print job is not permitted to be printed.

For example, a user may choose to print a document from an application, such as a web browser or word processor. The print driver may handle the print command and present a user interface window to the user that includes various standard options (e.g. color, duplex, finishing, number of copies) as well as options for setting time and/or location restrictions. The user may then select a time and/or time window that the document is and/or is not available for printing, such as only between 9 am and 5 pm on weekdays, only after 10 am on March 1, or only until 3 pm on February 8, etc.

Similarly a user may choose to set a location restriction. For example, the user may set a center point on a map display and select a radius such that only printers within that radius may print the document. For another example, the user may enter latitude and longitude coordinates along with a similar radius. In yet another example, the user may specify a geographic boundary such as city/county/state/country limits. In some implementations, the user may choose specific defined locations, such as restricting the printing of the document to print devices at a particular office or branch of an enterprise using a managed fleet of print devices.

Receive request instructions 125 may receive a request to retrieve the print job for printing. In some implementations, the request to retrieve the print job for printing may comprise a user authentication. For example, the print device may require and/or request that the user provide an authentication before printing can be performed, such as by signing in with a username/password, providing a user and/or print job specific personal identification number (PIN), using a smart token (e.g., RFID and/or NFC device), and/or another credential. The user authentication may be device and/or document specific (e.g. a PIN associated only with the document for the print job request).

In some implementations, a user may select the job for printing at a print device via a list displayed in a control panel of the print device. In some implementations the user may interact with the print device via another device, such as a web browser application on a computing device and/or an app on a smart phone in order to request that the print job be retrieved for printing.

Determination instructions 130 may determine whether the time restriction and the location restriction are satisfied by the request. For example, the print device may supply its own location and a time of the request. In some implementations, the print device may comprise a global positioning system interface, such as may be implemented in hardware and/or software to determine its location. In some implementations, the print device's location may be configured in software and/or firmware by an administrator (e.g., setting an office designation within an enterprise). In some implementations, the print device may use other means to determine its location such as IP-based location and/or WiFi and/or Bluetooth triangulation.

Similarly, the request for the print job may comprise a timestamp the request was created and/or a time for the requested print job to be printed. In various implementations, the request time may be compared to the time restriction. For example, a request that is timestamped before a time restriction permits the job to be printed may be denied. For another example, the same request may be granted if the request comprises a future time for the requested job to be printed that does satisfy the time restriction, though the job may not be actually printed and/or provided to the print device, until the time restriction is actually satisfied. For example, a user may request the print job at 9:00 am for the printing to be performed at 10:30 am. If the time restriction specifies that the print job cannot be printed until 10:00 am, the request may be held until and the print job not delivered to the print device until 10:30 am when the restriction is satisfied.

Provide print job instructions 135 may, in response to determining that the time restriction and the location restriction are satisfied by the request, provide the print job for printing. For example, the print job may be encoded in an appropriate rendering language for the requested print device and transmitted to the print device for printing.

In response to determining that the time restriction and the location restriction are not satisfied, provide print job instructions 135 may refuse to provide the print job for printing. For example, the print job may simply not be transmitted to the print device and/or a message may be displayed on the print device explaining that the restrictions are not satisfied.

In some implementations, provide print job instructions 135 may notify a user associated with the print job of the refusal to provide the print job for printing. The notification of the user associated with the print job of the refusal to provide the print job for printing may comprise, in some implementations an identifier associated with the user authentication who requested retrieval of the print job and/or a location from which the request was received. For example, if user A creates the print job and sets the time and/or location restrictions, they may be notified of the time, location, and/or identity of user B if user B attempts to request the print job when those time and/or location restrictions are not satisfied.

Figure 2:
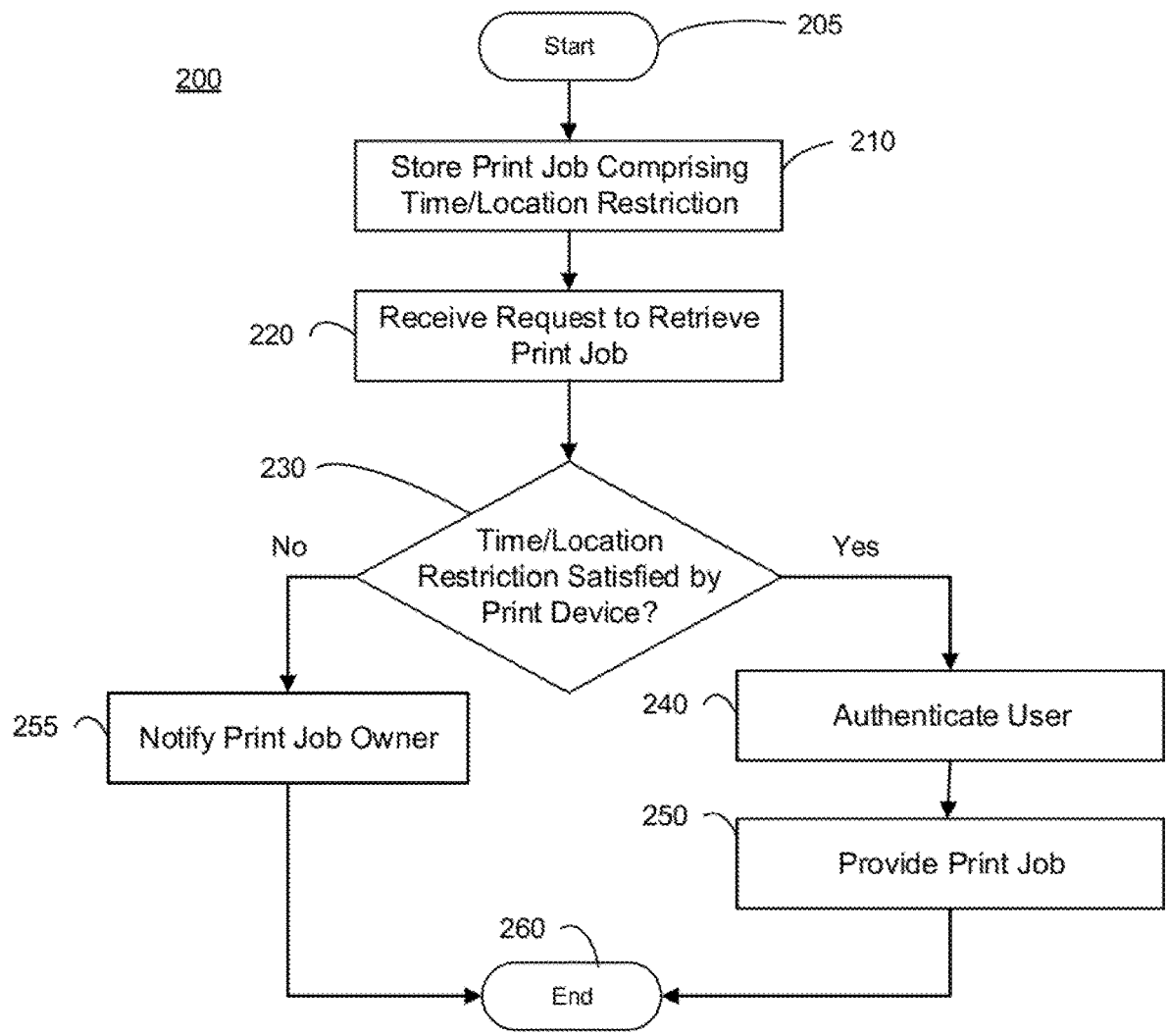
FIG. 2 is a block diagram of an example system for providing print job time and location restrictions.

FIG. 2 is a flowchart of an example method 200 for print job time and location restrictions. Although execution of method 200 is described below with reference to computing device 110, other suitable components for execution of method 200 may be used.

Method 200 may begin at stage 205 and advance to stage 210 where device 110 may store a print job comprising a time restriction and a location restriction. For example, the location restriction may comprise a geographic area in which the print device is located. In some implementations, computing device 110 may execute store print job instructions 120 to store a print job comprising a time restriction and a location restriction. The location restriction may comprise, for example, a geographic area in which a printing device must be located such as a defined radius from a central point, a building and/or buildings, and/or a map-based boundary (e.g., within city limits). The time restriction may comprise, for example, a window of time the print job is permitted to be printed, a time before which the print job is not permitted to be printed, and/or a time after which the print job is not permitted to be printed. In some implementations, the time restriction and the location restriction are set by a second user associated with storing the print job. For example, the document to be printed may be stored by a different user than the one requesting to print it. The storage of the print job may occur, for example, by encoding and/or encrypting the document and transmitting it to a network storage location accessible by various print devices. For example, the print job may be encrypted and stored on a cloud storage service and/or shared network drive.

The location restriction may comprise, for example, a geographic area in which a printing device must be located such as a defined radius from a central point, a building and/or buildings, and/or a map-based boundary (e.g., within city limits). The time restriction may comprise, for example, a window of time the print job is permitted to be printed, a time before which the print job is not permitted to be printed, and/or a time after which the print job is not permitted to be printed.

For example, a user may choose to print a document from an application, such as a web browser or word processor. The print driver may handle the print command and present a user interface window to the user that includes various standard options (e.g. color, duplex, finishing, number of copies) as well as options for setting time and/or location restrictions. The user may then select a time and/or time window that the document is and/or is not available for printing, such as only between 9 am and 5 pm on weekdays, only after 10 am on March 1, or only until 3 pm on February 8, etc.

Similarly a user may choose to set a location restriction. For example, the user may set a center point on a map display and select a radius such that only printers within that radius may print the document. For another example, the user may enter latitude and longitude coordinates along with a similar radius. In yet another example, the user may specify a geographic boundary such as city/county/state/country limits. In some implementations, the user may choose specific defined locations, such as restricting the printing of the document to print devices at a particular office or branch of an enterprise using a managed fleet of print devices.

Method 200 may then advance to stage 220 where computing device 110 may receive a request to retrieve the print job for printing from a print device. For example, computing device 110 may execute receive request instructions 125 to receive a request to retrieve the print job for printing. In some implementations, a user may select the job for printing at a print device via a list displayed in a control panel of the print device. In some implementations the user may interact with the print device via another device, such as a web browser application on a computing device and/or an app on a smart phone in order to request that the print job be retrieved for printing.

Method 200 may then advance to stage 230 where computing device 110 may determine whether the time restriction and the location restriction are satisfied by the print device. For example, computing device 110 may execute determination instructions 130 to determine whether the time restriction and the location restriction are satisfied by the request. For example, the print device may supply its own location and a time of the request. In some implementations, the print device may comprise a global positioning system interface, such as may be implemented in hardware and/or software to determine its location. In some implementations, the print device's location may be configured in software and/or firmware by an administrator (e.g., setting an office designation within an enterprise). In some implementations, the print device may use other means to determine its location such as IP-based location and/or WiFi and/or Bluetooth triangulation.

Similarly, the request for the print job may comprise a timestamp the request was created and/or a time for the requested print job to be printed. In various implementations, the request time may be compared to the time restriction. For example, a request that is timestamped before a time restriction permits the job to be printed may be denied. For another example, the same request may be granted if the request comprises a future time for the requested job to be printed that does satisfy the time restriction, though the job may not be actually printed and/or provided to the print device, until the time restriction is actually satisfied. For example, a user may request the print job at 9:00 am for the printing to be performed at 10:30 am. If the time restriction specifies that the print job cannot be printed until 10:00 am, the request may be held until and the print job not delivered to the print device until 10:30 am when the restriction is satisfied.

In response to determining that the time restriction and the location restriction are satisfied, method 200 may then advance to stage 240 where computing device 110 may authenticate a user associated with the request at the print device. In some implementations, the request to retrieve the print job for printing may comprise a user authentication. For example, the print device may require and/or request that the user provide an authentication before printing can be performed, such as by signing in with a username/password, providing a user and/or print job specific personal identification number (PIN), using a smart token (e.g., RFID and/or NFC device), and/or another credential. The user authentication may be device and/or document specific (e.g. a PIN associated only with the document for the print job request).

Method 200 may then advance to stage 250 where computing device 110 may provide the print job for printing on the printing device. For example, computing device 110 may execute provide print job instructions 135 to, in response to determining that the time restriction and the location restriction are satisfied by the request, provide the print job for printing. For example, the print job may be encoded in an appropriate rendering language for the requested print device and transmitted to the print device for printing.

In response to determining that the time restriction and the location restriction are not satisfied, provide print job instructions 135 may refuse to provide the print job for printing. For example, the print job may simply not be transmitted to the print device and/or a message may be displayed on the print device explaining that the restrictions are not satisfied.

In response to determining that the time restriction and the location restriction are not satisfied, method 200 may advance to stage 255 where computing device 110 may notify an owner of the print job of the request. For example, computing device 110 may execute provide print job instructions 135 to notify a user associated with the print job of the refusal to provide the print job for printing. The notification of the user associated with the print job of the refusal to provide the print job for printing may comprise, in some implementations an identifier associated with the user authentication who requested retrieval of the print job and/or a location from which the request was received. For example, if user A creates the print job and sets the time and/or location restrictions, they may be notified of the time, location, and/or identity of user B if user B attempts to request the print job when those time and/or location restrictions are not satisfied.

Method 200 may then end at stage 260.

Figure 3:
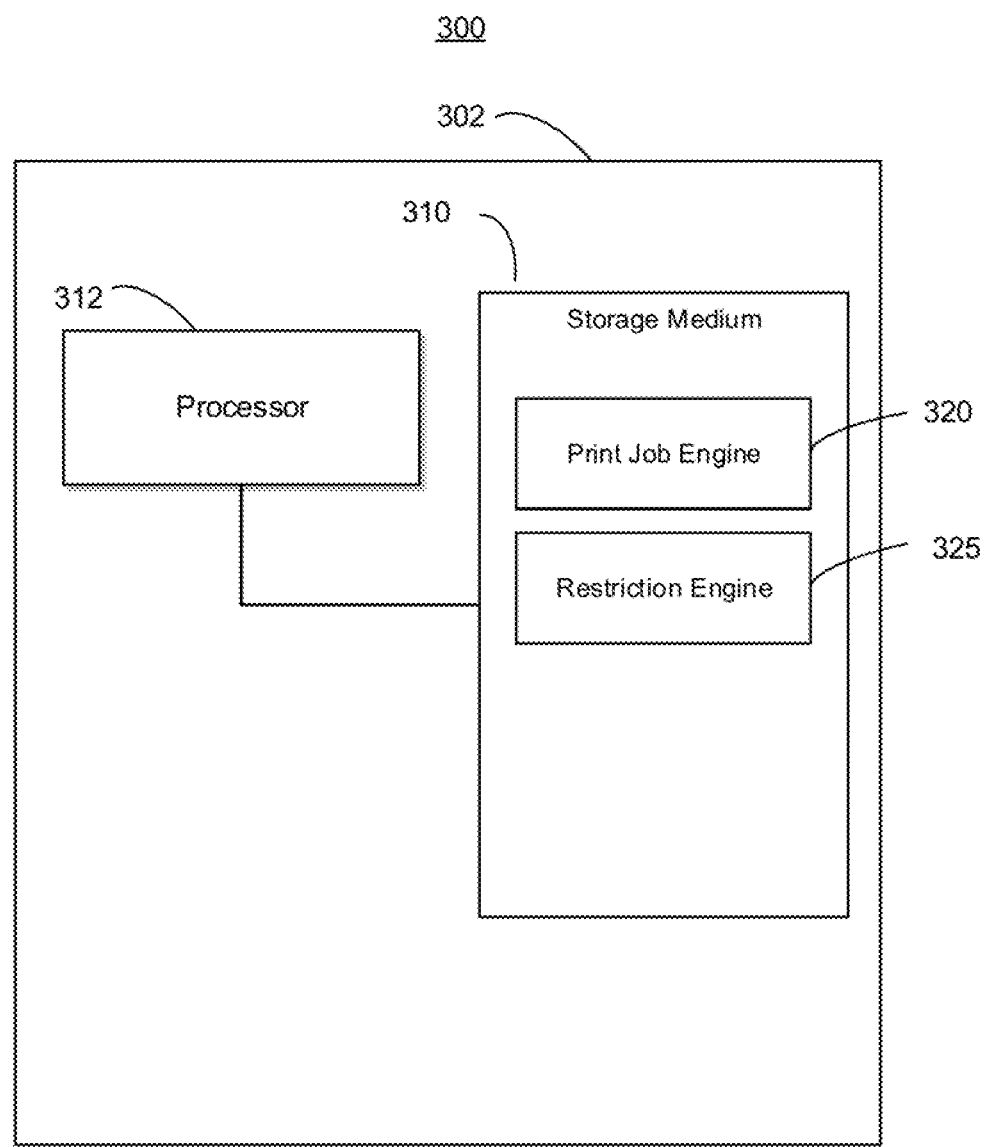
FIG. 3 is a flowchart of an example method for providing print job time and location restrictions.

FIG. 3 is a block diagram of an example apparatus 300 for providing print job time and location restrictions. Apparatus 300 may comprise a multi-function printer device 302 comprising a storage medium 310, and a processor 312. Device 302 may comprise and/or be associated with, for example, a general and/or special purpose computer, server, mainframe, desktop, laptop, tablet, smart phone, game console, printer, multi-function device, and/or any other system capable of providing computing capability consistent with providing the implementations described herein. Device 302 may store, in storage medium 310, a print job engine 320 and a restriction engine 325.

Each of engines 320, 325 may comprise any combination of hardware and programming to implement the functionalities of the respective engine. In examples described herein, such combinations of hardware and programming may be implemented in a number of different ways. For example, the programming for the engines may be processor executable instructions stored on a non-transitory machine-readable storage medium and the hardware for the engines may include a processing resource to execute those instructions. In such examples, the machine-readable storage medium may store instructions that, when executed by the processing resource, implement engines 320, 325. In such examples, device 302 may comprise the machine-readable storage medium storing the instructions and the processing resource to execute the instructions, or the machine-readable storage medium may be separate but accessible to apparatus 300 and the processing resource.

Print engine 320 may store a print job comprising a time restriction and a location restriction, receive a request to retrieve the print job for printing from a print device, and authenticate a user associated with the request. In some implementations, print engine 320 may store a print job comprising a time restriction and a location restriction. The location restriction may comprise, for example, a geographic area in which a printing device must be located such as a defined radius from a central point, a building and/or buildings, and/or a map-based boundary (e.g., within city limits). The time restriction may comprise, for example, a window of time the print job is permitted to be printed, a time before which the print job is not permitted to be printed, and/or a time after which the print job is not permitted to be printed. In some implementations, the time restriction and the location restriction are set by a second user associated with storing the print job. For example, the document to be printed may be stored by a different user than the one requesting to print it. The storage of the print job may occur, for example, by encoding and/or encrypting the document and transmitting it to a network storage location accessible by various print devices. For example, the print job may be encrypted and stored on a cloud storage service and/or shared network drive.

The location restriction may comprise, for example, a geographic area in which a printing device must be located such as a defined radius from a central point, a building and/or buildings, and/or a map-based boundary (e.g., within city limits). The time restriction may comprise, for example, a window of time the print job is permitted to be printed, a time before which the print job is not permitted to be printed, and/or a time after which the print job is not permitted to be printed.

For example, a user may choose to print a document from an application, such as a web browser or word processor. The print driver may handle the print command and present a user interface window to the user that includes various standard options (e.g. color, duplex, finishing, number of copies) as well as options for setting time and/or location restrictions. The user may then select a time and/or time window that the document is and/or is not available for printing, such as only between 9 am and 5 pm on weekdays, only after 10 am on March 1, or only until 3 pm on February 8, etc.

Similarly a user may choose to set a location restriction. For example, the user may set a center point on a map display and select a radius such that only printers within that radius may print the document. For another example, the user may enter latitude and longitude coordinates along with a similar radius. In yet another example, the user may specify a geographic boundary such as city/county/state/country limits. In some implementations, the user may choose specific defined locations, such as restricting the printing of the document to print devices at a particular office or branch of an enterprise using a managed fleet of print devices.

In some implementations, print engine 320 may receive a request to retrieve the print job for printing. In some implementations, the request to retrieve the print job for printing may comprise a user authentication. For example, the print device may require and/or request that the user provide an authentication before printing can be performed, such as by signing in with a username/password, providing a user and/or print job specific personal identification number (PIN), using a smart token (e.g., RFID and/or NFC device), and/or another credential. The user authentication may be device and/or document specific (e.g. a PIN associated only with the document for the print job request).

In some implementations, a user may select the job for printing at a print device via a list displayed in a control panel of the print device. In some implementations the user may interact with the print device via another device, such as a web browser application on a computing device and/or an app on a smart phone in order to request that the print job be retrieved for printing.

Restriction engine 325 may determine whether the time restriction and the location restriction are satisfied by the print device, and in response to determining that the time restriction and the location restriction are satisfied, provide the print job for printing on the printing device. In some implementations, restriction engine 325 may determine whether the time restriction and the location restriction are satisfied by the request. For example, the print device may supply its own location and a time of the request. In some implementations, the print device may comprise a global positioning system interface, such as may be implemented in hardware and/or software to determine its location. In some implementations, the print device's location may be configured in software and/or firmware by an administrator (e.g., setting an office designation within an enterprise). In some implementations, the print device may use other means to determine its location such as IP-based location and/or WiFi and/or Bluetooth triangulation.

Similarly, the request for the print job may comprise a timestamp the request was created and/or a time for the requested print job to be printed. In various implementations, the request time may be compared to the time restriction. For example, a request that is timestamped before a time restriction permits the job to be printed may be denied. For another example, the same request may be granted if the request comprises a future time for the requested job to be printed that does satisfy the time restriction, though the job may not be actually printed and/or provided to the print device, until the time restriction is actually satisfied. For example, a user may request the print job at 9:00 am for the printing to be performed at 10:30 am. If the time restriction specifies that the print job cannot be printed until 10:00 am, the request may be held until and the print job not delivered to the print device until 10:30 am when the restriction is satisfied.

In some implementations, provide print job restriction engine 325 may, in response to determining that the time restriction and the location restriction are satisfied by the request, provide the print job for printing. For example, the print job may be encoded in an appropriate rendering language for the requested print device and transmitted to the print device for printing.

In response to determining that the time restriction and the location restriction are not satisfied, provide print job instructions 135 may refuse to provide the print job for printing. For example, the print job may simply not be transmitted to the print device and/or a message may be displayed on the print device explaining that the restrictions are not satisfied.

In some implementations, restriction engine 325 may notify a user associated with the print job of the refusal to provide the print job for printing. The notification of the user associated with the print job of the refusal to provide the print job for printing may comprise, in some implementations an identifier associated with the user authentication who requested retrieval of the print job and/or a location from which the request was received. For example, if user A creates the print job and sets the time and/or location restrictions, they may be notified of the time, location, and/or identity of user B if user B attempts to request the print job when those time and/or location restrictions are not satisfied.

In the foregoing detailed description of the disclosure, reference is made to the accompanying drawings that form a part hereof, and in which is shown by way of illustration how examples of the disclosure may be practiced. These examples are described in sufficient detail to allow those of ordinary skill in the art to practice the examples of this disclosure, and it is to be understood that other examples may be utilized and that process, electrical, and/or structural changes may be made without departing from the scope of the present disclosure.

What is claimed is:

1. A non-transitory machine readable medium storing instructions executable by a processor of a computing device to:
   receive a request to print a document via a print command of an application running on the computing device and associated with the document;
   in response to receiving the request via the print command, present a user interface window of a print driver including print options governing printing of the document and restriction options for specifying a time restriction as to when the document can be printed and a location restriction as to where the document can be printed;
   store a print job for printing the document and comprising the time restriction and the location restriction received via user interaction with the user interface window of the print driver; and
   transmit the print job to another computing device that controls printing of the print job in accordance with the time restriction and the location restriction or to a printing device that prints the print job in accordance with the time restriction and the location restriction, where the print job is printed only when the time restriction and the location restriction have been satisfied.

2. The non-transitory machine readable medium of claim 1, wherein the location restriction comprises a geographic area in which a printing device must be located.

3. The non-transitory machine readable medium of claim 1, wherein the time restriction comprises a window of time in which the print job is permitted to be printed.

4. The non-transitory machine readable medium of claim 1, wherein the time restriction comprises a time before which the print job is not permitted to be printed.

5. The non-transitory machine readable medium of claim 1, wherein the time restriction comprises a time after which the print job is not permitted to be printed.

6. A method comprising:
   authenticating, by a printing device, a user;
   upon authentication of the user, presenting, by the printing device, a list of print jobs that have been generated and stored and that are associated with the user on a control panel of the printing device;
   receiving, by the printing device, user selection of a print job on the control panel from the presented list of print jobs, as a request to print the selected print job;
   determining, by the printing device, that the selected print job comprises a time restriction as to when a document to which the print job pertains can be printed and a location restriction as to where the document can be printed;
   determining, by the printing device, whether a current time satisfies the time restriction and a location of the printing device satisfies the location restriction;
   in response to determining that the time restriction and the location restriction are satisfied, retrieving and printing, by the printing device, the selected print job;
   in response to determining that the time restriction and the location restriction are not satisfied, refusing, by the printing device, to print the selected print job, and sending a notification to a different user who generated the print job of refusal to print the selected print job at the current time by the printing device.

7. The method of claim 6, wherein the location restriction comprises a geographic area in which the printing device must be located.

8. The method of claim 6, wherein the time restriction and the location restriction are set by a different user who generated the selected print job.

9. The method of claim 6, wherein the notification identifies the user authenticated by the printing device and from which the request to print the selected print job on the printing device was received.

10. The method of claim 6, wherein the notification identifies the location of the printing device.

11. The method of claim 6, wherein the notification identifies the current time at which the printing device refused to print the selected print job.

12. The method of claim 6, wherein the time restriction comprises a window of time in which the selected print job is permitted to be printed.

13. The method of claim 6, wherein the time restriction comprises a time before which the selected print job is not permitted to be printed.

14. The method of claim 6, wherein the time restriction comprises a time after which the selected print job is not permitted to be printed.

15. A system comprising:
a computing device to:
- receive a request to print a document via a print command of an application running on the computing device and associated with the document, from a first user of the computing device;
- in response to receiving the request, present a user interface window of a print driver including print options governing printing of the document and restriction options for specifying a time restriction as to when the document can be printed and a location restriction as to where the document can be printed;
- store a first print job for printing the document and comprising the time restriction and the location restriction received via user interaction with the user interface window of the print driver, and
- transmit the first print job, a printing device to:
- receive and store the first print job as transmitted by the computing device;
- authenticate a second user of the printing device;
- upon authentication of the user, present a list of print jobs that have been generated and stored and that are associated with the second user, including the first print job, on a control panel of the printing device;
- receive user selection of the first print job on the control panel, as a request to print the first print job;
- determine whether a current time satisfies the time restriction and a location of the printing device satisfies the location restriction,
- in response to determining that the time restriction and the location restriction are satisfied, retrieving and printing the first print job,
- in response to determining that the time restriction and the location restriction are not satisfied, refusing to print the first print job.

16. The system of claim 15, wherein the printing device is further to:
- in response to determining that the time restriction and the location restriction are not satisfied, send a notification to the first of refusal to print the selected print job at the current time by the printing device.

17. The system of claim 16, wherein the notification identifies:
- the second user authenticated by the printing device and from which the request to print the first print job on the printing device was received;
- the location of the printing device; and
- the current time at which the printing device refused to print the selected print job.

18. The system of claim 15, wherein the time restriction comprises either or both of a time before which the first print job is not permitted to be printed and a time after which the first print job is not permitted to be printed.

19. The system of claim 15, wherein the location restriction comprises a geographic area in which the printing device must be located.

* * * * *